United States Patent [19]

Nova

[11] Patent Number: 5,067,843

[45] Date of Patent: Nov. 26, 1991

[54] PULLING ATTACHMENT FOR FLEXIBLE CONDUIT

[76] Inventor: Wallace B. Nova, 25261 Turf Ave., Mission Viejo, Calif. 92691

[21] Appl. No.: 412,085

[22] Filed: Sep. 25, 1989

[51] Int. Cl.⁵ .............................................. F16B 7/18
[52] U.S. Cl. .................................... 403/301; 403/296; 254/134.3 FT
[58] Field of Search ............. 254/134.3 FT; 403/300, 403/301, 307, 78, 299, 296, 343; 24/115 R; 285/24

[56] References Cited

U.S. PATENT DOCUMENTS

| | | | |
|---|---|---|---|
| 2,509,100 | 5/1950 | Jordan | 254/134.3 FT |
| 3,346,284 | 10/1967 | Petersen et al. | 403/78 |
| 3,675,898 | 7/1972 | Fattor et al. | 403/301 X |
| 3,858,848 | 1/1975 | MacFetrich | 254/134.3 FT |
| 4,278,836 | 7/1981 | Bingham | 403/296 X |
| 4,432,663 | 2/1984 | Lasak et al. | 254/134.3 FT X |
| 4,635,989 | 1/1987 | Tremblay et al. | 254/134.3 FT X |

Primary Examiner—Peter M. Cuomo
Attorney, Agent, or Firm—William L. Chapin

[57] ABSTRACT

A tool for attaching a pulling cable to flexible metal conduit having a convolute inner wall surface has a generally cylindrically shaped rear body section having a raised helical rib adapted to threadingly engage the helical inner wall convolutions of a length of conduit. The front body section of the tool has a tapered, bullett-shape tip with a flat front face. A longitudinal disposed slot extending rearward from the front face of the tip is adapted to receive the grommeted end of a fish tape leader or similar pulling cable. Axially aligned holes extending transversely through the two laterally spaced apart from jaw members formed by the slot are provided to receive a securing member such as a screw which passes through the grommet, thereby securing the cable to the tool.

12 Claims, 1 Drawing Sheet

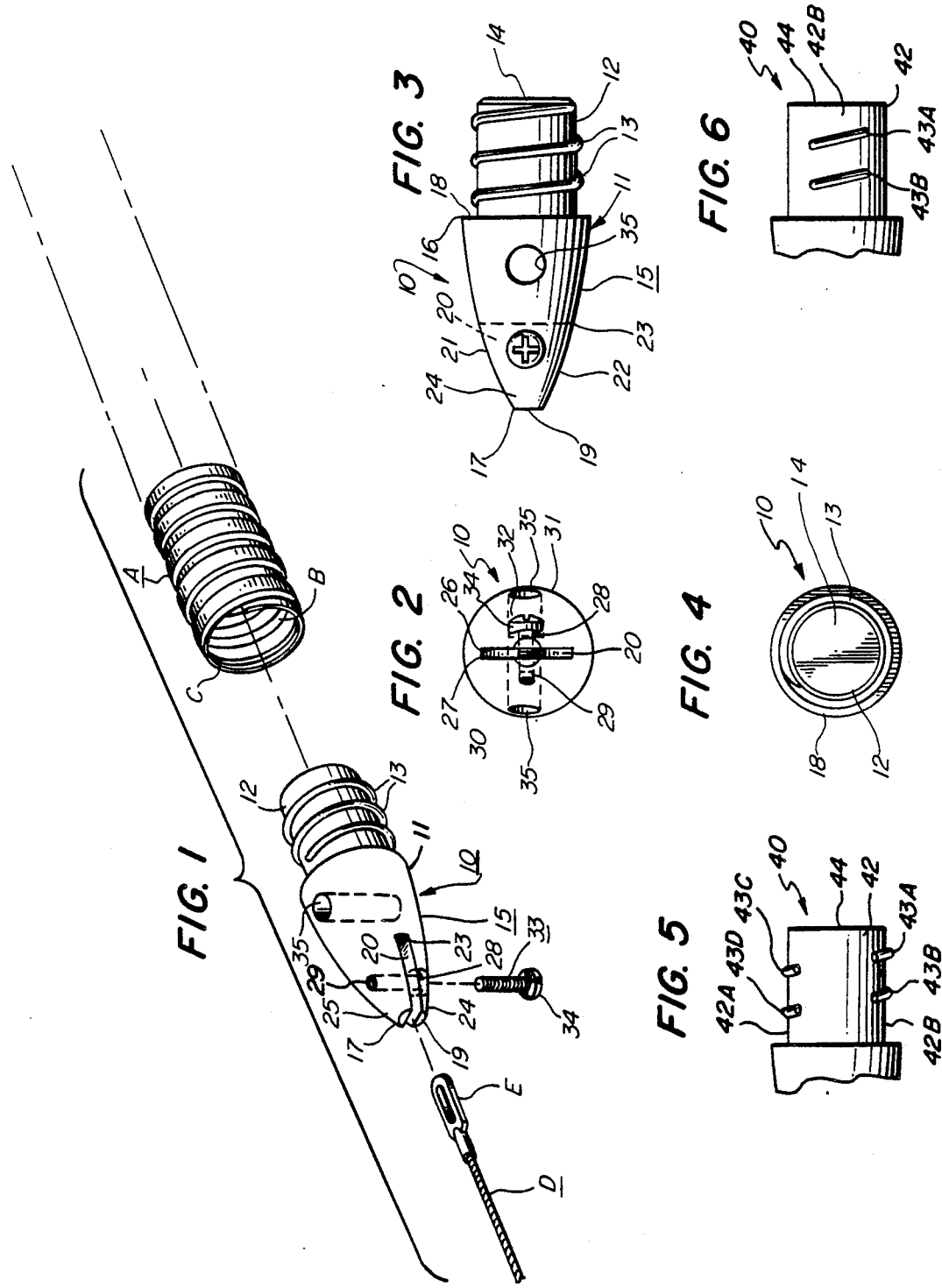

PULLING ATTACHMENT FOR FLEXIBLE CONDUIT

BACKGROUND OF THE INVENTION

1. Field of the Invention

The present invention relates to tools used by electricians, electrical contractors and the like, for handling flexible metal conduit, of the type used to protect and guide electrical wires used in buildings and other structures. More particularly, the invention relates to a tool for temporarily and securely joining a length of flexible conduit to a flexible pulling cable, to facilitate pulling the conduit through passageways in a structure.

2. Description of Background Art

Flexible metal conduit is used extensively in residential, commercial and industrial buildings and other structures. Such conduit is used to protect electrical wiring within the conduit, from mechanical impact damage and/or the elements.

Typical flexible metal conduit consists of long continuous lengths of thin-wall, hollow flexible metal tubing. Typical standard inner diameters for such tubing are one-half inch or three-quarters of an inch. The tubing is made flexible by fabricating it from long strips of metal which are curved convexly outwards, and formed into a helix in which the adjacent edges of helical loops are interlocked, but free to move a certain extent with respect to one another. Thus formed, flexible metal conduit has convolute inner and outer wall surfaces, each of which has a continuous helical indentation.

In typical applications in which flexible metal conduit is used, construction of a building or other structure is substantially near to completion before electrical wiring is installed. Therefore, it is usually necessary to install wiring, and the flexible metal conduits used to protect the wiring, by working the flexible wires and conduit through labyrinthine or serpentine passageways between walls, studs, joists, beams or other structural members of a building. Working or "snaking" flexible wires or conduit through passageways of a building requires some degree of effort and skill, and certain techniques have been developed to facilitate the process.

First, a thin, flat, flexible steel strip, somewhat like a very long tape measure, is threaded into a desired entrance or exit hole for electrical wiring, such as through a wall opening in a baseboard, near a ceiling lighting fixture, or near a wall switch. Then, the flexible fish tape is snaked through passageways between studs in the walls of a building until a flexible cable leader attached to the remote end of the fish tape exits through a desired exit or entrance opening. The distal end of the leader is then attached to one or more electrical wires or cable. Finally, the near or proximal end of the fish tape is grasped and pulled, pulling the attached wires or cable through the serpentine passageways defined by the original outgoing passage of the fish tape. Eventually, the end of the wire or cable attached to the fish tape exits through the hole into which the fish tape leader was initially inserted, allowing the wires to be connected to a desired switch or fixture.

Pulling a fish tape through a passageway with wires or cables attached to the fish tape requires a substantial amount of force. This is because the wires must be dragged along the passageways in contact with various frame members of the structure, and with insulation. Thus, a substantial amount of frictional forces are usually experienced in the process. Because of the high forces which are required to pull a fish tape and attached wires, a number of tools have been disclosed which permit a high pulling force to be exerted, while minimizing possible damage to the fish tape. An example of such a tool is found in U.S. Pat. No. 4,746,099, May 24, 1988, Lopes, Cam Action Fish Tape Puller.

The distal end of a fish tape leader may also be attached to one end of a length of flexible metal conduit, to permit the conduit to be pulled through a serpentine passageway within a structure, the passageway having been defined by the initial path of the fish tape, as described above.

Now, the flexible conduit obviously must be larger in diameter than the electrical wires and/or cables which it is intended to enclose. Also, the outer wall surface of flexible conduit is convolute, as described above, rather than being smooth like the outer surface of typical electrical wire or cable. Therefore, it usually requires a substantially larger force to pull conduit through a passageway than is required to pull wire or cable along the same path. For that reason, any attachment device used to attach a fish tape leader to the end of a flexible conduit which is to be pulled by the fish tape must be capable of transmitting a substantial tensional force. Also, it would be desirable for such an attachment device to be quickly and easily attachable to and removable from a length of flexible conduit.

A number of devices have been disclosed which are related to the task of pulling flexible members through serpentine passageways. These include the following U.S. Patents:

Kepler, U.S. Pat. No. 1,672,324, June 5, 1928, Wire threading Leader and Coupler.

Bergman, U.S. Pat. No. 2,339,671, Jan. 18, 1944, Cable Puller.

Battaglia, U.S. Pat. No. 4,078,767, Mar. 14, 1978, Wire Pulling Apparatus.

Breck, et al., U.S. Pat. No. 4,659,126, Apr. 21, 1987, Duct Pulling Tool, discloses a multi-element tool for engaging the inner surface of convolute flexible conduit. The present inventor is unaware of any conduit pulling attachment which has a unitary, or one-piece, conduit-engaging fitting.

OBJECTS OF THE INVENTION

An object of the present invention is to provide a tool for attachment between a flexible metal conduit and a flexible pulling member such as a fish tape.

Another object of the invention is to provide a pulling attachment for flexible conduit which is adapted to quick and easy attachment to and removal from flexible metal conduit.

Another object of the invention is to provide a pulling attachment for flexible conduit which facilitates smooth passage of the attachment and attached conduit through serpentine passageways.

Another object of the invention is to provide a pulling attachment for flexible conduit which is quickly and easily attachable to and removable from a fish tape leader or similar flexible pulling member.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a tool to facilitate pulling flexible conduit through serpentine passageways in buildings and other structures. The tool according to the present invention consists of an attachment, one end of which may readily be fastened to and unfastened from a length of flexible metal conduit. The other end of the tool is adapted to attachment to a fish tape leader, or other flexible pulling cable.

The flexible conduit tool according to the present invention consists essentially of an elongated metal body having an externally threaded rear section, and a tapered, bullet-shaped front section. The tip of the front section has a longitudinally disposed slot extending rearward from the front face of the tip, for receiving the grommeted end of a fish tape leader or similar pulling cable. Axially aligned holes extending transversely through the two side walls of the front section adjacent the slot are provided to receive a screw which passes through the opening in the fish tape leader. One of the holes is threaded to hold the screw and hence the leader secured to the tool.

The rear portion of the tool is of smaller diameter than the adjoining portion of the front section, the latter forming an annular wall flange at the intersection of the front and rear sections. A longitudinally disposed, raised helical rib spanning the length of the rear section is of the proper size, shape and pitch to threadably engage the helically convoluted inner wall surface of standard flexible metal conduit. Preferably, the front section of the tool has a hole extending transversely through the side walls of the tool, rearward of the screw hole. This through-hole is adapted to receive the shank of a screwdriver or metal rod, facilitating the application of torque to the tool in screwing it into or out of the conduit. The annular wall flange limits the depth to which the tool may be screwed into a length of conduit.

BRIEF DESCRIPTION OF THE DRAWINGS

FIG. 1 is a perspective view of the pulling attachment tool for flexible conduit according to the present invention, showing the attachment adjacent to a length of flexible conduit, and to a fish tape leader.

FIG. 2 is a front end elevation view of the tool of FIG. 1.

FIG. 3 is a side elevation view of the tool of FIG. 2.

FIG. 4 is a rear elevation view of the tool of FIG. 2.

FIG. 5 is a fragmentary upper elevation view of an alternate embodiment of the tool of FIG. 1.

FIG. 6 is a side elevation view of the embodiment of FIG. 5.

DETAILED DESCRIPTION OF THE INVENTION

FIGS. 1 through 4 show a tool, according to the present invention, for attachment at one end thereof to one end of a length of flexible metal conduit, and for attachment at the opposite longitudinal end thereof to an end of a flexible pulling cord or cable, such as a leader attached to one end of a metal fish tape.

As shown in FIGS. 1 through 5, the tool 10 has a longitudinally elongated, generally circularly symmetric body 11. The rear portion 12 of body 11 is of generally cylindrical shape, and has a length which may be slightly less than half of the overall length of the body.

Body 11 of tool 10 is preferably formed as a single piece of a strong, rigid metal such as steel, aluminum or zinc. The tool may be fabricated from any suitably strong and rigid material, by any suitable means such as machining a blank metal form on a screw machine. Preferably, however, to reduce the cost of the tool 10, body 11 of the tool is die cast from zinc or similar relatively low-cost material.

As may be seen best by referring to FIGS. 1, 3 and 4, the rear cylindrical section 12 of tool 10 has formed in its cylindrical wall surface a raised rib 13 of uniform thickness and height, the rib being formed in the shape of a helix. Helical rib 13 extends longitudinally forward from the rear face 14 of cylindrical rear section 12 to a transverse plane a short distance rearward of front section 15 of body 11. The pitch of helical rib 13 is relatively large, forming a relatively open helix of approximately 3 turns per inch, for a 0.725 inch diameter cylindrical body section 12 adapted for use with ½-inch inner diameter conduit. For use with conduit having an inner diameter of ¾-inch, a suitable diameter for rear section 12 is 0.890 inch. The aforementioned sizes adapt rib 13 to threadingly engage the internal helical channel B of a length of standard flexible metal conduit A having an inner diameter of 0.813 inch for ½-inch conduit, or 1.063 inch, for ¾ inch conduit.

As shown in FIGS. 1 through 3, front section 15 of body 11 of tool 10 has a generally curvilinear frustoconic shape, or bullet-like shape, tapering from a large diameter base 16 at its intersection with the rear section 12 of the body to a pointed front tip 17. Base 16 of front section 15 of body 11 is of larger diameter than rear cylindrical section 12 of the body. Also, the rear transverse annular face 18 of base 16 is perpendicularly disposed to the cylindrical wall surface of rear section 12. Thus, annular face 18 comprises an annular flange which abuts the front transverse face C of conduit A when the tool 10 is screwed into the open end of the conduit, thereby limiting the insertion depth of the tool into the conduit.

As may be seen best by referring to FIGS. 1 through 3, the front tip 17 of front section 15 of tool body 11 is truncated by a flat plane disposed perpendicularly to the longitudinal axis of the body to form a flat front transverse wall surface or face 19. A rectangular slot 20 disposed symmetrically with respect to a vertical longitudinal bisecting plane of body 11 extends rearward from the front face 19 of the body. Slot 20 extends a substantial longitudinal distance rearward from front face 19 of body 11, approximately one-quarter of the length of the body. Also, slot 20 extends through the upper wall surface 21 and lower wall surface 22 of front section 15 of body 11 along the entire length of the slot. Slot 20 terminates at its inner or rearward end in a flat vertical wall 23 disposed transversely and perpendicularly to the longitudinal axis of body 11. Slot 19 preferably has a uniform width of approximately 0.130 inch, and a length of approximately 0.650 inch.

Front section 15 of body 11 is divided by slot 20 into a bifurcated member having symmetrical front side and rear side jaw sections 24 and 25. The width of slot 20, between the inner facing wall surfaces 26 and 27 of jaw sections 24 and 25, respectively, is of the proper size to allow the loose insertion of the flattened, elongated eyelet E of a standard metal fish tape leader D, of the type shown in FIG. 1.

As shown in FIGS. 1 and 2, a threaded hole 28 extends perpendicularly through the front side jaw 24. Threaded hole 29 extends completely through front side jaw 24, parallel to and forward of rear vertical wall 23 of slot 20. An axially aligned hole 29 of slightly larger diameter than hole 28 extends outwards from the inner wall surface 27 of rear side jaw section 25, out through the outer face 30 of the rear side jaw section. Outer face 31 of front side jaw section 24 has a counter bored hole 32 concentric with threaded screw hole 28, for receiving the head 34 of a screw 33.

As shown in FIGS. 1 and 2, the front section 15 of tool body 11 preferably includes a hole 35 extending completely through the body, perpendicular to the longitudinal axis of the body. Hole 35 is located longitudinally between the rear vertical wall 23 of slot 20 and base 16 of front section 15. As shown in the Figures, the center line of hole 35 is parallel to and in the same horizontal bisecting plane of tool body 11 as are axially aligned screw holes 28 and 29. The function of hole 35 is described below.

Tool 10 is used as follows: First, the threaded rear section 12 of tool 10 is inserted into an open end of a length of standard, flexible metal conduit A of the type having a convolute inner and outer wall surface. Helical rib 13 of the tool 10 is engaged with the internal helical channel B of the conduit A. Threaded rear section 12 of the tool 10 is then screwed into conduit A by twisting the body 11 of the tool about its longitudinal axis, while gripping the conduit. If desired, a screwdriver or rod may be inserted into through-hole 35, to permit more tightening torque to be exerted on body 11 than could be readily exerted by gripping the body with one hand and twisting it.

Once tool 10 has been attached to a length of conduit A, a flexible fish tape is inserted into a desired conduit entrance or exit opening in a building, and snaked down through passageways behind the walls of the building until the leader end of the fish tape emerges through a desired exit or entrance opening. The eyelet E of the fish tape leader D is then inserted into slot 20 in the front face 19 of tool body 11, and a screw 33 screwed into hole 28 in front side jaw 24, sufficiently far to pass through eyelet E into hole 29 in rear side jaw 25, thus locking the eyelet in place in the slot. The remote end of the fish tape is then pulled on, dragging tool 10 and attached length of conduit A through the passageways behind the building walls, until the tool and leading end of the conduit emerges from the opening into which the fish tape was first inserted. Movement of the tool and conduit through passageways is facilitated by the bullet-shape of the front section 14 of the tool 10. The fish tape leader is then unfastened from the tool 10, and the tool unthreaded from the conduit. If desired, a screwdriver or rod may once again be inserted through through-hole 35, to facilitate unscrewing the tool 10 from the conduit.

FIGS. 5 and 6 illustrate an alternate embodiment 40 of tool 10. In the alternate embodiment 40 shown in FIGS. 5 and 6, the continuous raised helical rib 13 of basic embodiment 10 is replaced by a plurality of segments 43 of a helical rib, each of the segments having the same length. As may be seen best by referring to FIG. 5, the plurality of segments 43 lying on a helical path traced on the outer cylindrical wall surface 42A of rear cylindrical section 42 of tool 40 preferably consists of four segments 43A, 43B, 43C and 43D. A greater number of segments could be used if desired. A first pair of helical rib segments 43A and 43B are formed in a rear side 42 of cylindrical wall surface 42. Of segments 43, segment 43A is positioned nearest the rear face 44 of rear cylindrical section 42 of tool 40. Segment 43B is located forward of segment 43A, parallel to and longitudinally aligned therewith.

Helical rib segments 43C and 43D on front cylindrical surface 42B of cylindrical wall surface 42 are identical in size, shape and relative spacing to rear helical segments 43A and 43B, but are located forward some distance from rear face 44 of rear cylindrical section 12 such that segment 43B is spaced longitudinally midway between segments 43C and 43D. Thus positioned, the segments lie on a helical path beginning at rear face 44 and progressing clockwise as viewed from the rear of tool 40 sequentially around segments 43A, 43C, 43B, and 43D, respectively.

Segments 43 may be of any desired circumferential length. Preferably however, as shown in FIGS. 4 and 5, segments 43 have a length of approximately 60 degrees.

Tool 40, provided with helical rib segments 43 instead of a continuous helical rib, has been found to be equally effective in threadingly engaging the internal helical channel of flexible metal conduit. Moreover, the reduced total length of the helical segments, as compared with a continuous helical segment, reduces the frictional forces between the tool and conduit, facilitating the insertion and removal of the tool from the conduit.

I claim:

1. An attachment for releasably joining a flexible metal conduit, of the type having a convolute inner wall surface, in which said wall surface is formed with a helical groove extending rearward from a front annular wall surface, to an eye provided in one end of a flexible cable leader of the type attachable to a fish tape, said attachment comprising an elongated, rigid one-piece body having;
   a. a generally circularly symmetric, rear cylindrical section having an outer cylindrical wall surface which has a raised helical rib of generally uniform cross-sectional shape, said rib being longitudinally disposed and of the proper size, shape and pitch to adapt said rear cylindrical section of said attachment to threadingly engage said helical groove of said convolute inner wall surface of said conduit, and
   b. a tapered, generally frusto-conically shaped front section coaxial with and joined to said rear section, said front section having
      i. a transversely disposed front face,
      ii. a longitudinally disposed slot extending rearward from said front face, said slot forming in said front section first and second laterally spaced apart jaw sections adapted to insertably receive said eye of said cable leader, and
      iii. at lease one transversely disposed hole through said first jaw section, said hole communicating with said slot and being adapted to lockingly receive a pin disposed through said eye of said cable leader.

2. The attachment of claim 1 wherein at least a rear portion of said front section is generally circularly symmetric.

3. The attachment of claim 2 wherein the rear portion of said front section of said body joining said rear section of said body is of larger diameter than said rear section and of larger diameter than said conduit, thereby forming an annular wall section which may abut said front annular wall surface of said conduit when said attachment is screwed sufficiently far into said conduit, thereby limiting the depth to which said attachment may be screwed into said conduit.

4. The attachment of claim 1 further including a second hole extending through said second jaw section, said second hole being coaxially aligned with said hole through said first jaw section.

5. The attachment of claim 4 wherein said hole of said first jaw section is internally threaded to threadingly receive a screw.

6. The attachment of claim 5 wherein said second hole is of larger diameter than a screw adapted to engage said hole of said first jaw section.

7. The attachment of claim 6 wherein an outer entrance to said hole in said first jaw section is counterbored to receive a head of said screw.

8. The attachment of claim 1 further including a transverse hole extending through said front section of said body rearward of said slot, said hole being adapted to receive an elongated member for applying torque to said body about the longitudinal axis of said body.

9. The attachment of claim 1 wherein said raised helical rib is comprised of a plurality of spaced apart segments of a helix.

10. The attachment of claim 9 wherein said segments are of equal length.

11. The attachment of claim 10 wherein said length of each of said segments is approximately sixty degrees.

12. The attachment of claim 9 wherein said plurality is defined as four.

* * * * *